Jan. 26, 1965 R. M. WALP 3,167,649

ANALOGUE MULTIPLIER APPARATUS

Filed May 16, 1961 2 Sheets-Sheet 1

INVENTOR.
ROBERT M. WALP
BY
ATTORNEY.

INVENTOR.
ROBERT M. WALP
BY
V.C. Muller
ATTORNEY.

United States Patent Office 3,167,649

Patented Jan. 26, 1965

3,167,649

ANALOGUE MULTIPLIER APPARATUS

Robert M. Walp, 1145 E. Mariposa St., Altadena, Calif.

Filed May 16, 1961, Ser. No. 110,592
6 Claims. (Cl. 235—194)
(Granted under Title 35, U.S. Code (1952), sec. 266)

The invention described herein may be manufactured and used by or for the Government of the United States of America for governmental purposes without the payment of any royalties thereon or therefor.

This invention relates to computer systems and more particularly to an electronic analogue four-quadrant multiplication system.

While the prior art is replete with four-quadrant multiplication systems, those capable of substantially instantaneous response coupled with a reasonable degree of accuracy are found to be rather complex, correspondingly expensive and also presenting problems as to size, power consumption, stability and continuous operation reliability.

It is therefore an object of the instant invention to provide an improved electronic analogue four-quadrant multiplication technique and apparatus.

It is another object of the invention to provide an electronic four-quadrant multiplication technique and simplified four-quadrant multiplier apparatus yielding improved computation accuracy relative to that provided by prior art multiplier apparatus of comparable simplicity of equipment.

Another object of the invention is to provide a novel multi-element vacuum tube, and a simplified computer apparatus including said vacuum tube, to effect analogue four-quadrant multiplication.

Other objects and attendant advantages of this invention will be readily appreciated as the same becomes better understood by reference to the following detailed description when considered in connection with the accompanying drawing wherein.

In accordance with the present invention, the multiplication technique involves conversion of each input physical or mathematical variable to a balanced pair of analogue variables, i.e., to analogue variables which at each instant are equal as to absolute values, but of opposite sense, in practice preferably a balanced pair of oppositely-poled voltages. The technique further involves the use of one or more active circuit elements, in a manner effectively providing four multiplier units or sections, arranged in a network which suppresses or cancels output function terms which are spurious to a product term, but which arise because of non-linearity of active-element transfer characteristics, and which ordinarily deteriorate the accuracy of electronic multipliers.

Figure 1:
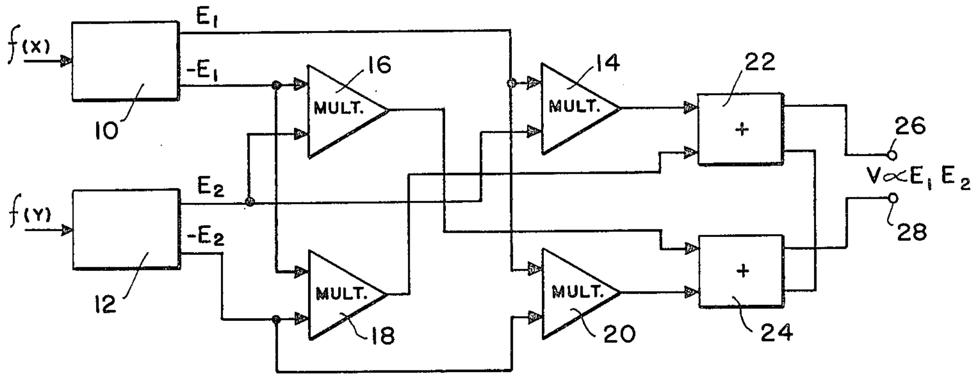
FIG. 1 illustrates diagrammatically a generalized complete embodiment of the invention.

An exemplary form of apparatus embodying principles of the present invention is illustrated in generalized block diagram manner in FIG. 1. Designating the generally independent physical or mathematical input quantities as $x$ and $y$, and their time-variable functions as $f(x)$ and $f(y)$, converters 10 and 12 operate to provide not only the direct analogue voltages $E_1$ and $E_2$, respectively, but also like voltages of opposite polarity, as indicated. The four multiplier units 14, 16, 18 and 20 are substantially alike as to transfer characteristics, each providing a load or output current expressed by an equation having the general form $$I=i+aE_1+bE_2+cE_1E_2$$

wherein I represents the load or output current, $E_1$ and $E_2$ represent the input voltages, and $a$, $b$, $c$ and $i$ represent constants. The multiplier units may here be regarded as delivering either currents I or proportional voltages to the summing devices 22 and 24, depending upon whether the load resistors into which the multipliers may work are contained in the summing devices 22 and 24 or in the multiplier units 14, 16, 18 and 20. Each summing device in any event operates to provide a voltage proportional to the algebraic summation of the currents I developed by the pair of multiplier units connected to that summing device. The output voltages of the summing devices 22 and 24 are combined differentially as by means of the output connections shown in FIG. 1, yielding the voltage V at the pair of output terminals 26 and 28. While the load current developed by each of the multiplier units contains several extraneous terms in addition to the desired product term $cE_1E_2$ as indicated by the characteristic equation given above, the FIG. 1 network functions to provide and combine the several currents I in such manner as to effect cancellation of the extraneous terms as will appear, resulting in an output voltage V proportional to the product of the voltages $E_1$ and $E_2$ and correspondingly proportional to the desired product of the functions $f(x)$ and $f(y)$.

In greater detail, the pairs of voltages applied to multiplier units 14, 16, 18 and 20 are, respectively, $E_1$ and $E_2$, $-E_1$ and $E_2$, $-E_1$ and $-E_2$, and $E_1$ and $-E_2$. The output currents I correspondingly developed by the multiplier units 14, 16, 18 and 20, respectively, are given by the expressions:

$$i+aE_1+bE_2+cE_1E_2 \quad (1)$$

$$i+aE_1+bE_2-cE_1E_2 \quad (2)$$

$$i-aE_1-bE_2+cE_1E_2 \quad (3)$$

and $$i+aE_1-bE_2-cE_1E_2 \quad (4)$$

The voltages provided by summing devices 22 and 24, respectively, are thus given by the expressions:

$$2k(i+cE_1E_2) \quad (5)$$

and $$2k(i-cE_1E_2) \quad (6)$$

where the constant $k$ is of magnitude dependent upon the load resistor and summing circuit design factors. The output voltage V resulting from differential combination of the summing device output voltages represented by Equations 5 and 6 is therefore given by the expression $4ckE_1E_2$, proportional to the product of the voltages $E_1$ and $E_2$ and correspondingly proportional to the product of the input functions $f(x)$ and $f(y)$ which they represent.

Figure 2:
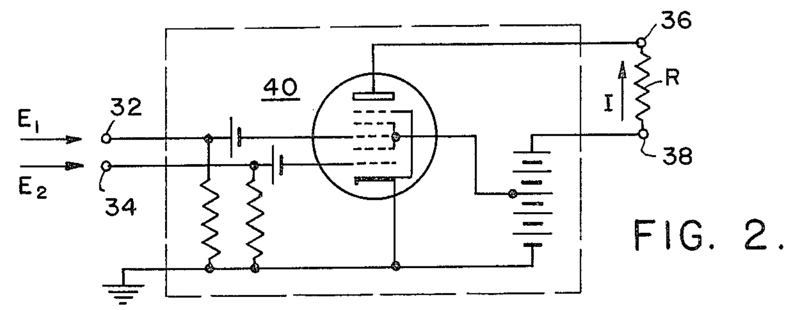
FIGS. 2 and 3 illustrate typical component units which may be utilized in the multiplier apparatus of the present invention.
Figure 3:
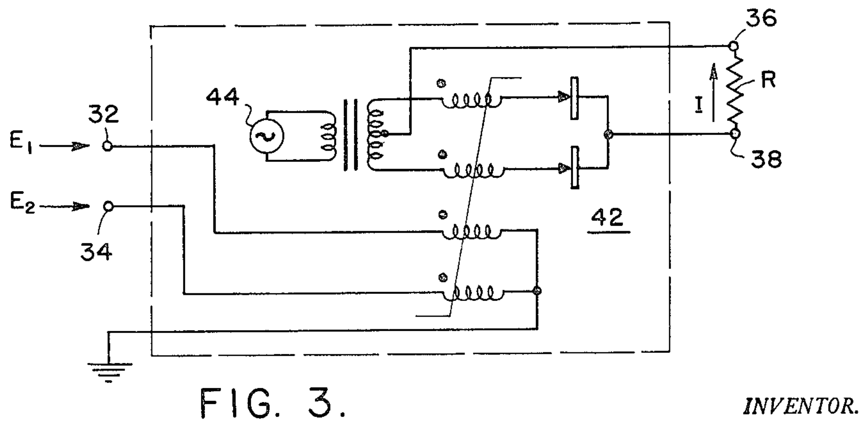

By way of example, the multiplier units shown in the generalized block diagram given in FIG. 1 may be supplied in the form of a multi-grid vacuum tube type of multiplier 40 as illustrated in FIG. 2, or as a magnetic amplifier 42 energized by an A.C. source 44 as shown in FIG. 3, each of these having input terminals 32 and 34 to which the pair of analogue voltages indicated generally as $E_1$ and $E_2$ may be applied, and a load resistor designated generally as R connected between output terminals 36 and 38. It may be noted at this point that while the transfer characteristic of a given type of active element is usually expressed in terms specific to that particular type of active element, for example in terms of inter-related transconductances in the case of a pentagrid mixer or converter type of vacuum tube employed in multiplier units, the equation and expressions as given earlier with reference to the multiplier units indicated in FIG. 1, generalized principally to simplify presentation and understanding of the invention, are fully applicable to the conventional multiplier units shown in FIGS. 2 and 3, and likewise fully applicable to the effective multiplier units in the multiplier apparatus later described with reference to FIG. 5.

Figure 4:
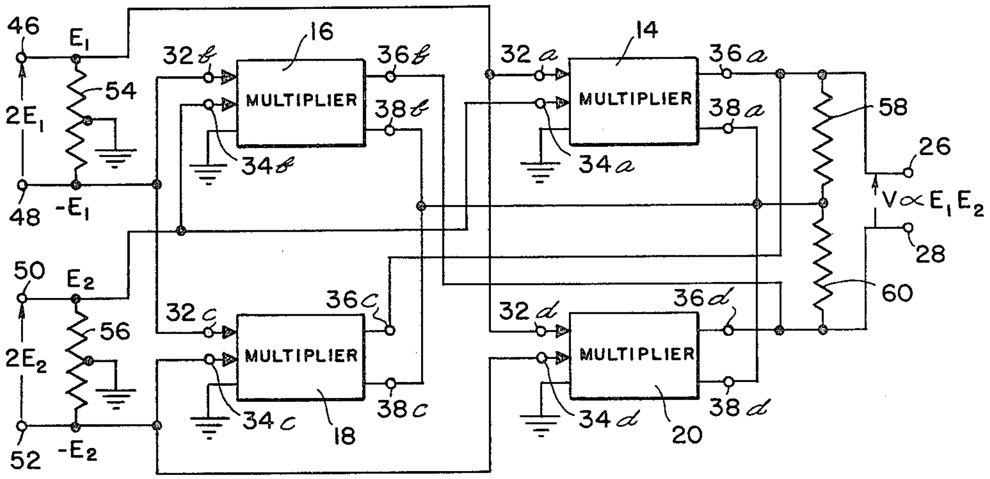
FIG. 4 illustrates in greater detail an electronic analogue multiplication network in accordance with the invention.

FIG. 4 illustrates a multiplier network similar to that shown in FIG. 1 but specifically in terms of multiplier units as shown in FIG. 2 or FIG. 3, including simplified means for providing oppositely poled input voltages and summation of multiplier output voltages. The voltage $2E_1$ applied to input terminals 46 and 48, and the voltage $2E_2$ applied to input terminals 50 and 52, are to be understood as analogues of the input functions $f(x)$ and $f(y)$ and provided by conventional converters which have been indicated schematically in FIG. 1. The balanced and oppositely-poled voltages $E_1$ and $-E_1$ are in this instance obtained from the voltage $2E_1$ simply by means of the grounded center-tap resistor 54 as illustrated. The voltages $E_2$ and $-E_2$ are obtained from the voltage $2E_2$ by use of the center-tapped resistor 56 in similar manner. As shown, voltage $E_1$ is applied to input terminals 32*a* and 32*d* of multiplier units 14 and 20, respectively; voltage $-E_1$ is applied to input terminals 32*b* and 32*c* of multiplier units 16 and 18, respectively; voltage $E_2$ is applied to input terminals 34*a* and 34*b* of multiplier units 14 and 16, respectively; and voltage $-E_2$ is applied to input terminals 34*c* and 34*d* of multiplier units 18 and 20, respectively. Output terminals 36*a* and 38*a* of multiplier unit 14, and output terminals 36*c* and 38*c* of multiplier unit 18, are connected across resistor 58; similarly, output terminals 36*b* and 38*b* of multiplier unit 16, and output terminals 36*d* and 38*d* of multiplier unit 20, are connected across resistor 60. Resistor 58 in this instance thus serves both as a load resistor and as a summing device across which is developed a voltage corresponding to the summation of the currents I supplied by the multiplier units 14 and 18. Similarly, across resistor 60 is developed a voltage corresponding to the summation of the currents I supplied by the multiplier units 16 and 20. The series-differential combination of these latter voltages, as indicated, thus provides at the pair of terminals 26 and 28 an output voltage V which is proportional to the product of the analogue voltages $2E_1$ and $2E_2$ and correspondingly proportional to the product of the input functions $f(x)$ and $f(x)$ which they represent.

Figure 5:
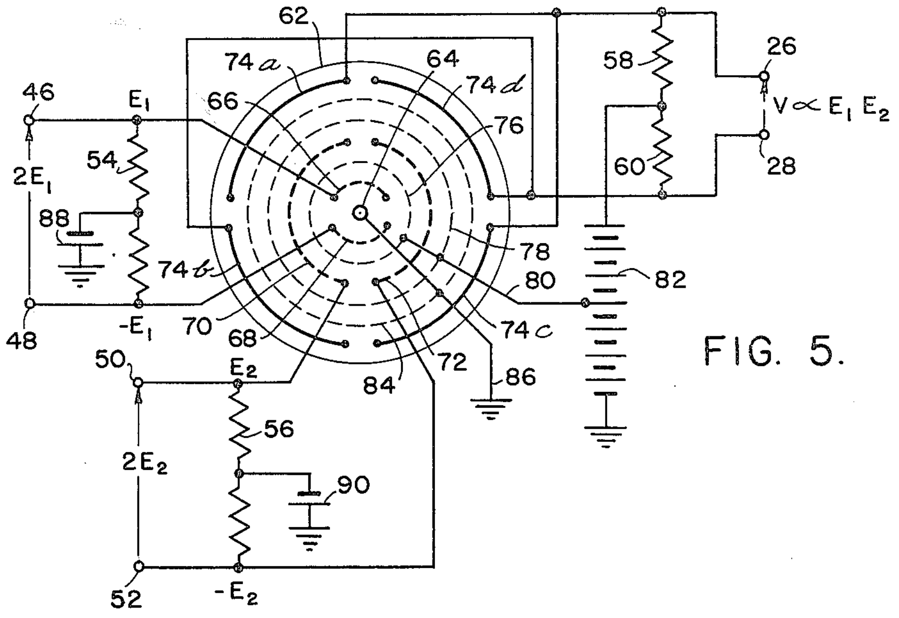
FIG. 5 is a schematic illustration of a novel multi-electrode vacuum tube and associated circuitry, which effect additional simplification in instrumentation of the present invention.

While the improved and simplified analogue multiplier system as thus far described may employ multiplier units of conventional type, further simplification of apparatus embodying the improved four-quadrant multiplication technique is made possible by use of a unique multi-element vacuum tube 62 having a novel configuration and combination of elements, and associated circuitry, as illustrated schematically in FIG. 5, wherein circuit elements corresponding to those in FIG. 4 are designated by like reference numerals. In this multi-element vacuum tube 62, associated with a common cathode 64 in a preferably cylindrical configuration are concentric control grid structures and a concentric plate structure, each having electrically distinct sections as illustrated. Sections 66 and 68 forming the inner control grid structure may be regarded as separated by a cleavage plane (not shown) extending through the cathode 64. Similarly, sections 70 and 72 forming the outer control grid structure are separated by another cleavage plane, perpendicular to that of the first control grid structure. Sections 74*a*, 74*b*, 74*c* and 74*d* forming the quadrantally-sectioned plate structure are thus defined by the orthogonal cleavage planes which separate the sections of the inner and outer control grid structures.

Not of importance to an understanding of the multi-element vacuum tube 62 as thus far described, but in order to improve operational characteristics as has been done in conventional pentagrid mixer or converter tubes, tube 62 may include ancillary grid structures, in the illustrated instance a screen grid structure formed by the two grids 76 and 78, shown connected by lead 80 to an intermediate voltage supplied by voltage source 82, and a suppressor grid 84, shown connected to cathode 64 and by lead 86 to the indicated reference ground. The inter-electrode spacings and other parameters may be made the same as in conventional pentagrid or converter tubes such as the commercially available 6A8 or 6L7 type.

Relating the FIG. 5 embodiment to those shown in FIGS. 1 and 4, inner control grid section 66, outer control grid section 70 and plate section 74*a* form an active unit corresponding to that in multiplier unit 14; similarly, inner control grid section 68, outer control grid section 70 and plate section 74*b* relate to multiplier unit 16; inner control grid section 68, outer control grid section 72 and plate section 74*c* relate to multiplier unit 18; and inner control grid section 66, outer control grid section 72 and plate section 74*d* relate to multiplier unit 20. The circuitry associated with vacuum tube 62 effects tube energization and biasing, in addition to providing oppositely-poled balanced input voltages and enabling summation of output currents or voltages as in the FIG. 1 and FIG. 4 embodiments. Suitable grid-to-cathode biasing voltages are in this instance provided by voltage sources 88 and 90 connected between ground and the center-taps of resistors 54 and 56. Resistors 54 and 56 also serve to effect conversion of the input voltages $2E_1$ and $2E_2$, supplied as analogue voltages to the pair of input terminals 50 and 52 as in FIG. 4, to balanced but oppositely-poled voltages for application to the control grid sections, as indicated. Resistors 58 and 60 serve both as output load resistors and again as output current or voltage summing devices. Multi-element vacuum tube 62 and its associated circuitry thus operate to develop currents or voltages and to yield their summations in accordance with the expressions and equations given with reference to the FIG. 1 and FIG. 4 embodiments, correspondingly developing at terminals 26 and 28 an output voltage V which is proportional to the products of the functions represented by the input voltages.

Thus, while not a mere assemblage of four physically and electrically distinct sets of tube elements, multi-element vacuum tube 62 and its associated circuitry as illustrated in FIG. 5 provide a computer apparatus embodying the novel four-quadrant multiplication technique as described in connection with the FIG. 1 and FIG. 4 apparatus but with further simplification and its attendant improvement and advantages.

Obviously many modifications and variations of the present invention are possible in the light of the above teachings. It is therefore to be understood that within the scope of the appended claims the invention may be practiced otherwise than as specifically described.

What is claimed is:

1. A vacuum tube comprising: an elongated cathode structure; a first control grid structure surrounding and spaced from said cathode structure; a second control grid structure surrounding and spaced from said first control grid structure; a plate structure surrounding and spaced from said second control grid structure; said plate structure having four electrically distinct sections defined by orthogonal cleavage planes containing said elongated cathode structure; said first control grid structure having two sections defined by one of said cleavage planes; and said second control grid structure having two sections defined by the other of said cleavage planes.

2. A vacuum tube as defined in claim 1 wherein said cathode, control grid and plate structures are of cylindrical configuration and associated concentrically.

3. An electronic analogue four-quadrant multiplication apparatus comprising, in combination: converter means for providing first and second analogue input voltages $E_1$ and $E_2$ representative of first and second variable quantities, respectively, and for providing a corresponding pair of oppositely-poled analogue input voltages $-E_1$ and $-E_2$; a vacuum tube comprising an elongated cathode structure, a pair of radially-spaced control grid structures surrounding said cathode structure, a plate structure surrounding said control grid structures, said plate structure having diametrically-opposed first and third sections and diametrically-opposed second and fourth sections defined by orthogonal cleavage planes containing said elongated cathode structure, one of said control grid structures having two sections defined by one of said cleavage planes, and the other of said control grid structures having two sections defined by the other of said cleavage planes; means for applying the voltage $E_1$ to that control grid structure section electronically associated with said first and fourth plate structure sections, the voltage $-E_1$ to that control grid structure section electronically associated with said second and third plate structure sections, the voltage $E_2$ to that control grid structure section electronically associated with said first and second plate structure sections, and the voltage $-E_2$ to that control grid structure section electronically associated with said third and fourth plate structure sections; said plate structure sections each providing a load current expressed by the algebraic summation $$i+aE_1+bE_2+cE_1E_2$$

wherein $i$, $a$, $b$ and $c$ are constants and wherein the signs of terms involving the voltages $E_1$ and $E_2$ are dependent upon the polarities of said voltages; means for deriving an intermediate output voltage proportional to algebraic summation of the load currents provided by said first and third plate structure sections; means for deriving an intermediate output voltage proportional to algebraic summation of the load currents provided by said second and fourth plate structure sections; and means differentially combining said intermediate output voltages, whereby to yield an analogue output voltage substantially proportional to the product of said first and second variable quantities.

4. An electronic analogue four-quadrant multiplication apparatus comprising, in combination: converter means for providing first and second analogue input voltages $E_1$ and $E_2$ representative of first and second variable quantities, respectively, and for providing a corresponding pair of oppositely-poled analogue input voltages $-E_1$ and $-E_2$; a vacuum tube comprising an elongated cathode structure, a pair of radially-spaced control grid structures surrounding said cathode structure, a plate structure surrounding said control grid structures, said plate structure having diametrically-opposed first and third sections and diametrically-opposed second and fourth sections defined by orthogonal cleavage planes containing said elongated cathode structure, one of said control grid structures having two sections defined by one of said cleavage planes, and the other of said control grid structures having two sections defined by the other of said cleavage planes; means for applying the voltage $E_1$ to that control grid structure section electronically associated with said first and fourth plate structure sections, the voltage $-E_1$ to that control grid structure section electronically associated with said second and third plate structure sections, the voltage $E_2$ to that control grid structure section electronically associated with said first and second plate structure sections, and the voltage $-E_2$ to that control grid structure section electronically associated with said third and fourth plate structure sections; said plate structure sections each providing a load current including a component proportional to the product of its pair of input voltages; means for deriving an intermediate output voltage proportional to algebraic summation of the load currents provided by said first and third plate structure sections; means for deriving an intermediate output voltage proportional to algebraic summation of the load currents provided by said second and fourth plate structure sections; and means differentially combining said intermediate output voltages, whereby to yield an analogue output voltage substantially proportional to the product of said first and second variable quantities.

5. An electronic analogue four-quadrant multiplication apparatus comprising, in combination: a vacuum tube comprising an elongated cathode structure, a pair of radially-spaced control grid structures surrounding said cathode structure, a plate structure surrounding said control grid structures, said plate structure having diametrically-opposed first and third sections and diametrically-opposed second and fourth sections defined by orthogonal cleavage planes containing said elongated cathode structure, one of said control grid structures having two sections defined by one of said cleavage planes, and the other of said control grid structures having two sections defined by the other of said cleavage planes; means for applying a voltage $E_1$ to that control grid structure section electronically associated with said first and fourth plate structure sections, a voltage $-E_1$ to that control grid structure section electronically associated with said second and third plate structure sections, a voltage $E_2$ to that control grid structure section electronically associated with said first and second plate structure sections, and a voltage $-E_2$ to that control grid structure section electronically associated with said third and fourth plate structure sections, wherein $E_1$ and $E_2$ are analogue input voltages proportional to first and second variable values which are to be multiplied, and $-E_1$ and $-E_2$ are analogue input voltages, of like magnitudes but oppositely-poled relative to $E_1$ and $E_2$, respectively; said plate structure sections each providing a load current expressed by the algebraic summation $$i+aE_1+bE_2+cE_1E_2$$

wherein $i$, $a$, $b$ and $c$ are constants and wherein the signs or terms involving the voltages $E_1$ and $E_2$ are dependent upon the polarities of said voltages; means for deriving an intermediate output voltage proportional to algebraic summation of the load currents provided by said first and third plate structure sections; means for deriving an intermediate output voltage proportional to algebraic summation of the load currents provided by said second and fourth plate structure sections; and means differentially combining said intermediate output voltages, whereby to yield an analogue output voltage substantially proportional to the product of said first and second variable values.

6. An electronic analogue four-quadrant multiplication apparatus comprising, in combination: a vacuum tube comprising an elongated cathode structure, a pair of radially-spaced control grid structures surrounding said cathode structure, a plate structure surrounding said control grid structures, said plate structure having diametrically-opposed first and third sections and diametrically-opposed second and fourth sections defined by orthogonal cleavage planes containing said elongated cathode structure, one of said control grid structures having two sections defined by one of said cleavage planes, and the other of said control grid structures having two sections defined by the other of said cleavage planes; means for applying a voltage $E_1$ to that control grid structure section electronically associated with said first and fourth plate structure sections, a voltage $-E_1$ to that control grid structure section electronically associated with said second and third plate structure sections, a voltage $E_2$ to that control grid structure section electronically associated with said first and second plate structure sections, and a voltage $-E_2$ to that control grid structure section electronically associated with said third and fourth plate structure sections, wherein $E_1$ and $E_2$ are analogue input voltages proportional to first and second variable values which are to be multiplied, and $-E_1$ and $-E_2$ are analogue input voltages, of like magnitudes but oppositely-poled relative to $E_1$ and $E_2$, respectively; said plate structure sections each providing a load current, including a component proportional to the product of a pair of input voltages; means for deriving an intermediate output voltage proportional to algebraic summation of the load currents provided by said first and third plate structure sections; means for deriving an intermediate output voltage proportional to algebraic summation of the load currents provided by said second and fourth plate structure sections; and means differentially combining said intermediate output voltages, whereby to yield an analogue output voltage substantially proportional to the product of said first and second variable values.

References Cited in the file of this patent

UNITED STATES PATENTS

| | | |
|---|---|---|
| 1,873,026 | Peterson | Aug. 23, 1932 |
| 2,006,716 | Parker | July 2, 1935 |
| 2,533,405 | Skellett | Dec. 12, 1950 |
| 2,735,616 | Hoadley | Feb. 21, 1956 |
| 2,862,127 | Maynard | Nov. 25, 1958 |
| 2,973,146 | Schmid | Feb. 28, 1961 |
| 2,979,263 | Keister | Apr. 11, 1961 |